May 18, 1965    A. S. SEELEY    3,184,254
BALL HITCH FOR CONNECTABLE VEHICLES
Filed March 6, 1964
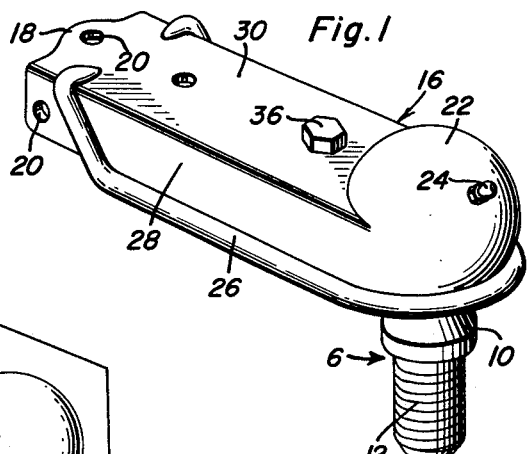
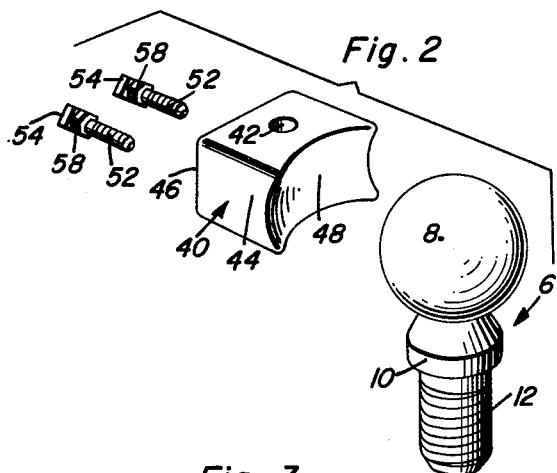
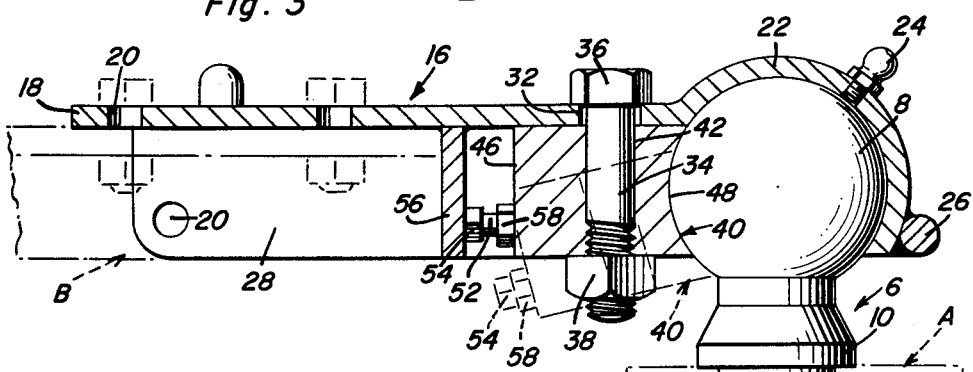
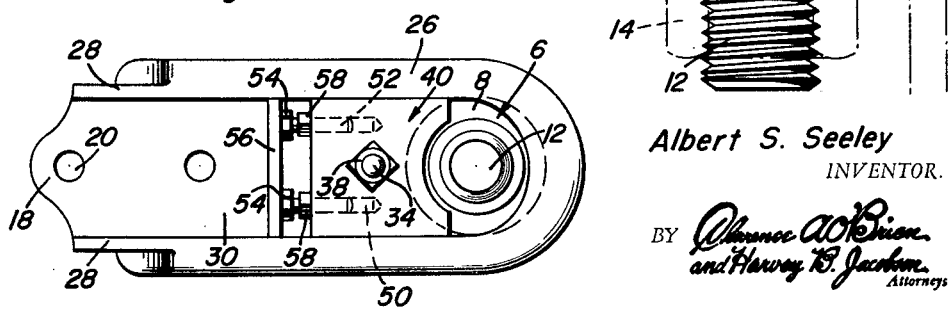
Albert S. Seeley
INVENTOR.

United States Patent Office 3,184,254
Patented May 18, 1965

3,184,254
BALL HITCH FOR CONNECTABLE VEHICLES
Albert S. Seeley, Centerville, Iowa
(Box 17, Plano, Iowa)
Filed Mar. 6, 1964, Ser. No. 349,947
2 Claims. (Cl. 280—513)

The present invention relates to means for quickly but reliably connecting oriented rearward and forward ends of first and second vehicles, respectively, to each other and wherein the means is characterized in part by a well known ball hitch bolted to and anchored on the rearward end of the first or forward vehicle.

As will be clear from the preceding general statement of the invention it is common in the art to provide a tractor-trailer-type coupling wherein a ball hitch is provided on the tractor, or equivalent pull vehicle, and wherein the ball head is fitted into a generally spherical socket provided on the cooperating forward end of a coupling device or unit which is constructed for attachment at its rearward end to the trailer or equivalent second vehicle. The Moss tractor-trailer hitch disclosed in Patent 2,853,316 of September 23, 7958 may be referred to here as generally indicative of the state of the art to which the present invention relates.

It is an objective in the instant matter to structurally, functionally and in other ways improve upon prior art vehicle interconnecting and coupling devices wherein one of the devices comprises a substantially conventional-type readily accessible ball hitch and, in doing so, to advance the art and to provide a structurally novel adaptation which will meet with manufacturing economies of manufacturers, will justify approval and endorsement of retailers and sellers and complies with the needs of users.

In carrying out a preferred embodiment of the invention a onepiece cast or an equivalently made elongated channel-shaped housing is provided, and is so constructed that it may be readily secured to a part of the vehicle being towed. In addition, the end adjacent the socket member is recessed to provide a complemental part of the socket.

The present invention is novel in that it provides an abutment, more particularly, a firm and reliable generally rectangular block. The block is fitted into the channel, has its leading end properly recessed and contoured to provide the ball-contacting surface, has a bolt hole to accommodate an attaching and retaining bolt whereby upon loosening and removing the bolt the block-like abutment can be dropped down through the open bottom of the channel for removal and to facilitate use of the overall coupling device or unit.

The invention also features simple jack screws which are provided with available adjusting nuts, are fitted into sockets provided therefor in the abutment block and have their headed ends releasably contacting a fixed end thrust plate which spans the channel portion of the aforementioned housing.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a view in perspective of the head of the ball hitch (conventional) fitting into the socket provided therefor on the improved readily attachable and detachable coupling device;

FIGURE 2 is a view in perspective with certain of the component parts shown in exploded relationship;

FIGURE 3 is a view on a larger scale based on FIG. 1 and wherein the essential component parts are shown in cooperative relationship;

FIGURE 4 is a bottom plan view of the structure illustrated in FIG. 3.

Referring first to FIG. 3 the reference character A designates, generally speaking, means at the rear end of the first or pulling vehicle referred to in the prior art as a tractor. The second vehicle, the one which is to be towed by the first vehicle, is denoted in phantom lines by the reference character B. This vehicle compares with the trailer in a tractor-trailer combination.

The first relatively stationary coupler or coupling means is denoted by the numeral 6. This part is referred to here as is common in the art, as a ball hitch and comprises the customary ball-shaped head 8 mounted integrally atop the anchoring shank 10 provided with a screw-threaded shank portion 12 to accommodate an assembling and retaining nut 14. This ball hitch is accordingly anchored and in readiness for use on the means A. It is readily accessible and the improved coupling device or coupler is expressly constructed for ready-to-use connection therewith. The improved device comprises an elongated rigid channel-shaped housing 16 the lefthand or rear end of which 18 is provided with suitable fastener-accommodating holes 20, said holes being appropriately arranged to permit this, the trailing end portion, of the housing to be bolted or otherwise secured in place on the second vehicle or means B. The forward or leading end of the housing is of spherical form and provides a socket member 22 which is precisely made for reception and retention of the ball head 8. The numeral 24 designates a readily applicable and removable grease gun fitting which can be employed for lubricating the joint (FIG. 3) whenever necessary or desired. Exteriorly, the housing is provided around its open bottom portion with a reinforcing bead 26 of suitable shape. The channel or body portion of the housing comprises a pair of opposed parallel longitudinal walls 28 having their upper lengthwise edges joined together by an intervening web or top wall 30. Rearwardly of the spherical socket member the top wall is centrally provided with a slot 32 of predetermined dimension and to accommodate the shank 34 and head 36 of an applicable and removable assembling bolt. This bolt has its lower end screw-threaded to accommodate a complemental assembling and retaining nut 38.

The bolt and nut means carried by the slotted top wall of the channel is cooperable with a bolt hole provided therefor and extending through a generally rectangular block-like abutment member 40. The bolt hole is designated at 42. This block-like member is of a cross-sectional dimension that it completely fills the channel portion in which it is positioned when used in the manner illustrated in FIG. 3. Accordingly, it has flat sides 44 and a flat rearward end 46. The forward end is recessed to provide a concave part-spherical socket portion 48 which cooperates with the socket portion of the socket member 22 in the manner illustrated in FIG. 3. The lower rearward half-portion of the block is provided with a pair of coplanar spaced parallel sockets 50 which open through the rear wall 46 of the block and serve to accommodate the screw-threaded shank or stem portions of simple jackscrews 52 whose headed end portions 54 bear against a transverse fixed end thrust plate 56 which is joined along its edge portions with the walls 30 and 28 in a manner to span the median portion of the channel. The righthand vertical surface portion of this plate or partition 56 is in proper relation with respect to the abutment block 40, the bolt 34 and more particularly with respect to the socket-forming surface 48 and co-operating socket-forming surfaces of the socket member 22.

It will be clear that the abutment or block is properly constructed for coaction with the channel portion and so that the surface 48 assumes the ball-contacting position illustrated in FIG. 3. The abutment is bolted in place by the bolt 34 and nut 38 and is tightened to retain the desired adjusted position by the aforementioned jack screws 52 fitting into their sockets 50 and adjusted to desired positional relationship by the tool-tightened nuts 58.

It will be evident that the ball-abutting and holding block or abutment 40 has a concaved surface or recess 48 which contacts and covers maximum surfaces of the ball. When the bolt is in place in the channel the block cooperates in providing a solid complete socket for the ball. The construction shown and described is precision-made and accordingly the component parts cooperate in providing an overall adaptation which well serves the purposes for which it is intended. The nuts 58 on the jackscrews are accessible as are the jackscrews between the surface 46 and end thrust partition or plate 56 to facilitate the adjustment and application and removal of the abutment or block 40. The improved hitch is simple, practical, susceptible of mass production, designed so that it can be built for both heavy and light purposes, is safe, saves time in hitching and unhitching the vehicle and otherwise achieves the end result desired.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination, a first vehicle having an upstanding stationary ball-type coupling head; and an improved coupling device separably connectable with said ball-type head and comprising: an elongated open-bottom housing channel-shaped in cross-section and embodying a pair of longitudinally spaced parallel side walls joined at their top portions by a top wall, said housing having a leading end fashioned into and embodying a generally spherical open-bottom socket member for reception of said ball-type head, the trailing end of said housing embodying adapter means adapted to be operatively connected with a second vehicle which, in use, trails behind and is adapted to be pulled through the medium of said coupling device, and a readily applicable and removable abutment comprising a substantially rectangular clamping block located in the channel portion of said housing between the side walls and top wall, the cross-sectional thickness of said block corresponding to the cross-section of said channel portion and having a top wall contacting the underneath side of the top wall of the housing, the bottom wall being flush with the lower edges of the side walls of the housing, said block having a forwardly directed face, said face being recessed and contoured to provide a part-spherical seat oriented and coordinated with and having coacting contact with a cooperating surface of said head, and means assembling and maintaining said abutment block in its operative position in said channel portion, said means embodying a bolt passing through one of the housing walls and also through a bolt hole provided therefor in said block, the threaded shank of said bolt being exposed and having a retaining and adjusting nut and said nut being freely accessible, said channel being provided intermediate its ends with a transverse wall constituting an end thrust member, and jackscrews carried by said block and having headed ends engageable with said end thrust member.

2. The structure defined in claim 1 and wherein said jackscrews are fitted operatively into sockets provided therefor in said block, each jackscrew being provided with a nut, and said nut being engageable with a cooperating end of said block.

References Cited by the Examiner

UNITED STATES PATENTS

| 2,178,094 | 10/39 | Berluti | 280—513 |
| 2,475,780 | 7/49 | Fearnehough | 280—513 |
| 2,732,224 | 1/56 | Deebel | 280—513 |
| 2,853,316 | 9/58 | Moss | 280—513 X |
| 2,878,036 | 3/59 | Simmons | 280—513 X |

A. HARRY LEVY, *Primary Examiner.*